US012433609B2

(12) United States Patent
Yadav (10) Patent No.: US 12,433,609 B2
(45) Date of Patent: Oct. 7, 2025

(54) SYSTEMS AND METHODS FOR ULTRASONICALLY-ASSISTED PLACEMENT OF ORTHOPEDIC IMPLANTS

(71) Applicant: MIRUS LLC, Marietta, GA (US)

(72) Inventor: Jay Yadav, Sandy Springs, GA (US)

(73) Assignee: MIRUS LLC, Marietta, GA (US)

( * ) Notice: Subject to any disclaimer, the term of this patent is extended or adjusted under 35 U.S.C. 154(b) by 931 days.

(21) Appl. No.: 17/613,535

(22) PCT Filed: May 28, 2020

(86) PCT No.: PCT/US2020/034952
§ 371 (c)(1),
(2) Date: Nov. 23, 2021

(87) PCT Pub. No.: WO2020/243327
PCT Pub. Date: Dec. 3, 2020

(65) Prior Publication Data
US 2022/0249119 A1 Aug. 11, 2022

Related U.S. Application Data

(60) Provisional application No. 62/853,255, filed on May 28, 2019.

(51) Int. Cl.
*A61B 17/16* (2006.01)
*A61B 17/00* (2006.01)
(Continued)

(52) U.S. Cl.
CPC .... *A61B 17/1655* (2013.01); *A61B 17/00234* (2013.01); *A61B 17/1604* (2013.01); *A61B 17/1615* (2013.01); *A61B 17/1626* (2013.01); *A61B 17/1628* (2013.01); *A61B 17/1631* (2013.01); *A61B 17/320068* (2013.01);
(Continued)

(58) Field of Classification Search
CPC .............. A61B 17/320068; A61B 17/7032
See application file for complete search history.

(56) References Cited

U.S. PATENT DOCUMENTS 6,204,592 B1    3/2001  Hur
8,353,912 B2 *  1/2013  Darian ........... A61B 17/320068
                                                  606/279
(Continued)

FOREIGN PATENT DOCUMENTS

WO      92/22259 A2    6/1992
WO      2018/078832 A1 5/2018

OTHER PUBLICATIONS

International Search Report and Written Opinion issued in PCT/US2020/034952, dated Sep. 4, 2020, 10 pages.
(Continued)

*Primary Examiner* — Andrew Yang
(74) *Attorney, Agent, or Firm* — UB Greensfelder LLP; Brian E. Turung (57) ABSTRACT

Systems and associated methods for ultrasonically-assisted placement of orthopedic implants are described herein. An example system includes an ultrasonic generator, a transducer, and a probe, surgical instrument, and/or an implant. Ultrasonic energy can be delivered to a region of a bone using the system to remove a portion of the bone.

20 Claims, 10 Drawing Sheets

(51) Int. Cl.
*A61B 17/32* (2006.01)
*A61B 17/70* (2006.01)
*A61B 17/84* (2006.01)
*A61B 17/86* (2006.01)
*B06B 3/00* (2006.01)
*A61B 17/34* (2006.01)

(52) U.S. Cl.
CPC ........ *A61B 17/7001* (2013.01); *A61B 17/848* (2013.01); *A61B 17/864* (2013.01); *B06B 3/00* (2013.01); *A61B 2017/00106* (2013.01); *A61B 2017/00146* (2013.01); *A61B 2017/00292* (2013.01); *A61B 2017/00415* (2013.01); *A61B 2017/00973* (2013.01); *A61B 2017/3413* (2013.01)

(56) References Cited

U.S. PATENT DOCUMENTS

| | | | |
|---|---|---|---|
| 11,786,259 B1 * | 10/2023 | Singh | A61B 17/1628 606/79 |
| 2009/0163901 A1 | 6/2009 | Fisher et al. | |
| 2009/0318945 A1 | 12/2009 | Yoshimine et al. | |
| 2012/0316474 A1 | 12/2012 | Bonutti et al. | |
| 2017/0333052 A1 | 11/2017 | Ding et al. | |
| 2017/0367727 A1 | 12/2017 | Sakai | |
| 2017/0368828 A1 | 12/2017 | Sakai | |
| 2018/0110572 A1 | 4/2018 | Flatt | |
| 2018/0289432 A1 | 10/2018 | Kostrzewski et al. | |
| 2018/0325608 A1 * | 11/2018 | Kang | A61B 34/20 |
| 2020/0222116 A1 | 7/2020 | Yadav | |

OTHER PUBLICATIONS

Shin, Myung-Hoon et al. "Accuracy and safety in pedicle screw placement in the thoracic and lumbar spines: comparison study between conventional C-arm fluoroscopy and navigation coupled with O-arm® guided methods." Journal of Korean Neurosurgical Society 52.3 (2012): 204-209.

Lian, Xiaofeng, et al. "Total 3D Airo® navigation for minimally invasive transforaminal lumbar interbody fusion." BioMed research international 2016 (2016), Article ID 5027340, 8 pages.

Co-pending U.S. Appl. No. 16/884,977, filed May 27, 2020.

Office Action issued in U.S. Appl. No. 16/741,564 dated May 12, 2022, 17 pages.

Office Action issued in U.S. Appl. No. 16/884,977 dated Mar. 17, 2022, 13 pages.

Lian, X. et al., "Total 3D Airo Navigation for Minimally Invasive Transforaminal Lumbar Interbody Fusion". Biomed Research International, vol. 2016, pp. 1-8 (2016).

Shin, M-H et al., "Accuracy and Safety in Pedicle Screw Placement in the Thoracic and Lumbar Spines: Comparison Study between Conventional C-Arm Fluoroscopy and Navigation Coupled with O-Arm Guided Methods", J. Korean Neurosurg Soc, vol. 52, pp. 2004-2009 (2012).

* cited by examiner

Screw Placement Time savings

| Jamshidi/Guidewire Technique | Navigated Brainlab/AiroCT | Ultrasonically-assisted system |
|---|---|---|
| Create incision | Create incision | Create incision |
| Insert Jamshidi and target pedicle | Place navigated guide tube | Insert VITESSE driver assembly |
| Insert Guidewire | Place drill | Drive pedicle screw |
| Remove Jamshidi | Remove drill | Remove driver assembly |
| Insert tap over guidewire | Place tap | |
| Remove tap over guidewire | Remove tap | |
| Insert screw over guidewire | Place screw driver | |
| Remove guidewire | Remove screw driver | |
| Remove driver from screw | | |
| 3.8 min[1] | 2.6 min[2] | ~1 min |

1. Journal of Korean Neurosurgical Society 2012; 52(3): 204-209.
2. BioMed Research International Volume 2016, Article ID 5027340

*FIG. 10*

SYSTEMS AND METHODS FOR ULTRASONICALLY-ASSISTED PLACEMENT OF ORTHOPEDIC IMPLANTS

CROSS-REFERENCE TO RELATED APPLICATIONS

This is a national stage application of International Application No. PCT/US2020/034952, filed on May 28, 2020, and entitled "SYSTEMS AND METHODS FOR ULTRASONICALLY-ASSISTED PLACEMENT OF ORTHOPEDIC IMPLANTS," which claims the benefit of U.S. provisional patent application No. 62/853,255, filed on May 28, 2019, and entitled "SYSTEMS AND METHODS FOR ULTRASONICALLY-ASSISTED PLACEMENT OF ORTHOPEDIC IMPLANTS," the disclosure of which are expressly incorporated herein by reference in their entireties.

TECHNICAL FIELD

The present disclosure relates generally to orthopedic surgery and, more particularly, to a system and method for ultrasonically-assisted placement of orthopedic implants.

BACKGROUND

Many orthopedic surgeries, such as those involving the spine, are complex procedures that require a high degree of precision. For example, the spine is in close proximity to delicate anatomical structures such as the spinal cord and nerve roots. Pedicle screw placement is among the most effective schemes for stabilizing the spine. With pedicle diameters ranging from 4 to 20 mm, screw fixation into the pedicle requires great precision to avoid skiving, cortex violation and damage to surrounding nerves and/or spinal cord. Compounding the problem is limited surgical exposure and visibility, particularly in the case of minimally invasive procedures. Consequently, the risk of misplaced implants or other complications is high.

Current means of implant placement relies on rudimentary mechanical instrumentation such as rotary drills and burrs that impact high forces on the bone and increase the possibility of skiving or other inaccuracies due to bone movement such as in image guided surgeries. Consequently the implant placement lacks consistency and precision. Such uncertainty in implant placement has a negative impact on long term clinical outcomes, patient quality of life, and the ability to predict and control costs associated with surgery, recovery, and rehabilitation.

The presently disclosed systems and associated methods for ultrasonically-assisted placement of orthopedic implants are directed at overcoming one or more of the problems set forth above and/or other problems in the art.

SUMMARY

According to one aspect, the present disclosure is directed to a method for ultrasonically-assisted placement of implants. The method may comprise delivering ultrasonic energy directly to a surgical instrument such as a Jamshidi needle, K-wire, awl, probe, tap, or screwdriver that is in contact with the bone region targeted for removal and/or is being prepared for implant placement. This allows the user to use the mechanical abilities of the tool along with ultrasonic energy to accomplish the surgical goals. The method may also comprise delivering ultrasonic energy via a probe to the bone. The probe can optionally be inside of a cannulated tool or tube. The probe is preferably in close proximity or in contact with the region targeted for removal. The method further comprises controlling the ultrasonic power, frequency, amplitude, pulse width, time, and other parameters such that removal rate and area of bone removed is tailored to the specific goals of the procedure. The method further comprises switching between or combining rotary and ultrasonic vibratory modes of bone removal so as to achieve optimal placement of the implant. The method further comprises sensing and analyzing the reflected ultrasonic waves to determine properties of the material in contact with the probe or instruments and/or distances of objects, surfaces, and/or boundaries.

In accordance with another aspect, the present disclosure is directed to a tool for ultrasonic assisted placement of an implant. In one embodiment the tool is a cannulated surgical instrument such as a Jamshidi needle, K-wire, awl, probe, or tap through which a probe is passed. This allows the user to use the mechanical abilities of the tool along with ultrasonic energy to accomplish the surgical goals. In yet another embodiment the tool is a cannulated screwdriver coupled to a cannulated screw. The probe is passed through both the screwdriver and screw in this case. This also allows for ultrasonic energy to be utilized along with the normal functionality of a traditional surgical screwdriver.

In accordance with another aspect, the present disclosure is directed to a system for ultrasonic assisted placement of an orthopedic implant. The system comprises a ultrasonic generator coupled to a transducer. The transducer is optionally equipped with a horn. The transducer and/or horn is coupled to surgical instruments or to a probe. The probe may be used standalone or be passed through cannulated surgical instruments. The ultrasonic generator is equipped with a means to control the ultrasonic power, amplitude of vibration, frequency, duration, pulses, and/or timing. The ultrasonic generator further has means for a user to interact with it for the purpose on controlling the ultrasonic energy such as buttons, foot pedals, I/O devices, and/or a user interface on a computer monitor. The system may also include cannulated surgical instruments that accommodate the ultrasonic probe and allows utilization ultrasonic vibration in conjunction with conventional mechanical (e.g. rotary) modes to place the implant into the bony anatomy. The system may also include a tubular retractor or tissue protector for minimally invasive procedures. The system may further include a robotically controlled arm and/or guide for precise positioning of the probe and/or surgical instrument.

An example method for ultrasonically-assisted placement of an orthopedic implant is described herein. The method includes delivering ultrasonic energy to a bone to cause removal of a portion of the bone at a target location. The ultrasonic energy is delivered via a probe coupled to an ultrasonic generator and a transducer. Additionally, the probe is aligned with the target location on the bone to facilitate delivery of the ultrasonic energy to the target location.

In some implementations, the method includes providing the probe having the ultrasonic generator and the transducer.

In some implementations, the probe is passed through a cannula of a surgical instrument. In some implementations, the ultrasonic energy is directly coupled to a surgical instrument in contact with a surface of the bone. Optionally, the surgical instrument is a K-wire, Jamshidi needle, awl, probe tool, or tap. Optionally, the surgical instrument is a surgical screwdriver.

In some implementations, the method includes controlling at least one of ultrasonic power, amplitude, frequency, duration, beam width, and/or region of contact to cause removal of the portion of the bone at the target location.

In some implementations, the method includes mechanically removing the portion of the bone, at least partially, using a surgical instrument.

In some implementations, the method includes switching between or combining mechanical and ultrasonic modes of bone removal.

In some implementations, the ultrasonic removal of the portion of the bone occurs concurrent with placement of the orthopedic implant.

In some implementations, the ultrasonic generator is configured to generate frequencies in the 10-150 kHz range.

In some implementations, the probe is attached to a robotic arm.

In some implementations, the method includes detecting reflected ultrasonic waves using the transducer.

In some implementations, delivery of the ultrasonic energy to the target location is configured to reduce dynamic friction between the probe and the bone. Alternatively or additionally, delivery of the ultrasonic energy to the target location is configured to reduce a reaction force. Alternatively or additionally, delivery of the ultrasonic energy to the target location is configured to reduce or eliminate a risk of skiving.

An example system for ultrasonically-assisted placement of an orthopedic implant is also describe herein. The system includes an ultrasonic generator, a transducer coupled to the ultrasonic generator, and a probe coupled to the transducer. The probe is configured to deliver ultrasonic energy. Additionally, the tip of the probe is configured to deliver the ultrasonic energy to a portion of a bone.

In some implementations, the system includes a surgical instrument, where the transducer is directly coupled to the surgical instrument. In some implementations, the system includes a surgical instrument, where the probe is arranged in a cannula of the surgical instrument. Optionally, the surgical instrument is a K-wire, Jamshidi needle, awl, probe tool, or tap. Optionally, the surgical instrument is a surgical screwdriver. Optionally, the system includes a screw, and the screwdriver is coupled to the screw.

In some implementations, the system includes a robotic arm, where the surgical instrument is coupled to the robotic arm. Optionally, the system includes a guide coupled to the robotic arm, where the surgical instrument is coupled to the guide.

In some implementations, the ultrasonic generator includes a controller configured to control at least one of ultrasonic power, amplitude, duration, frequency, or beam width of the ultrasonic energy.

In some implementations, the ultrasonic generator comprises a user interface configured to receive commands from a user.

In some implementations, the ultrasonic generator is configured to generate frequencies in a range from 10 to 150 kHz.

In some implementations, the system includes a robotic arm, where the probe is coupled to the robotic arm. Optionally, the system includes a guide coupled to the robotic arm, where the probe is coupled to the guide.

In some implementations, the transducer is further configured to detect reflected ultrasonic waves.

In some implementations, delivery of the ultrasonic energy to the target location is configured to reduce dynamic friction between the probe and the bone. Alternatively or additionally, delivery of the ultrasonic energy to the target location is configured to reduce a reaction force. Alternatively or additionally, delivery of the ultrasonic energy to the target location is configured to reduce or eliminate a risk of skiving.

An example surgical instrument for ultrasonically-assisted placement of an orthopedic implant is also described herein. The surgical instrument includes a cannula for passage of a flexible or rigid probe; and a tip configured to allow passage of ultrasonic energy and retention of the probe. Optionally, the surgical instrument is a K-wire, Jamshidi needle, awl, probe tool, or tap. Optionally, the surgical instrument is a surgical screwdriver.

Another example system for ultrasonically-assisted placement of an orthopedic implant is describe herein. The system includes an ultrasonic generator, a transducer coupled to the ultrasonic generator, a probe coupled to the transducer, and a surgical instrument coupled to the probe. The tip of the surgical instrument is configured to deliver the ultrasonic energy to a portion of a bone.

Another example system for ultrasonically-assisted placement of an orthopedic implant is describe herein. The system includes an ultrasonic generator, a transducer coupled to the ultrasonic generator, a probe coupled to the transducer, a surgical instrument coupled to the probe, and an implant coupled to the surgical instrument. The tip of the implant is configured to deliver the ultrasonic energy to a portion of a bone.

Another example system for ultrasonically-assisted placement of an orthopedic implant is describe herein. The system includes an ultrasonic generator, a transducer coupled to the ultrasonic generator, and a surgical instrument coupled to the transducer. The tip of the surgical instrument is configured to deliver the ultrasonic energy to a portion of a bone.

Another example system for ultrasonically-assisted placement of an orthopedic implant is describe herein. The system includes an ultrasonic generator, a transducer coupled to the ultrasonic generator, a surgical instrument coupled to the transducer, and an implant coupled to the surgical instrument. The tip of the implant is configured to deliver the ultrasonic energy to a portion of a bone.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Figure 1:
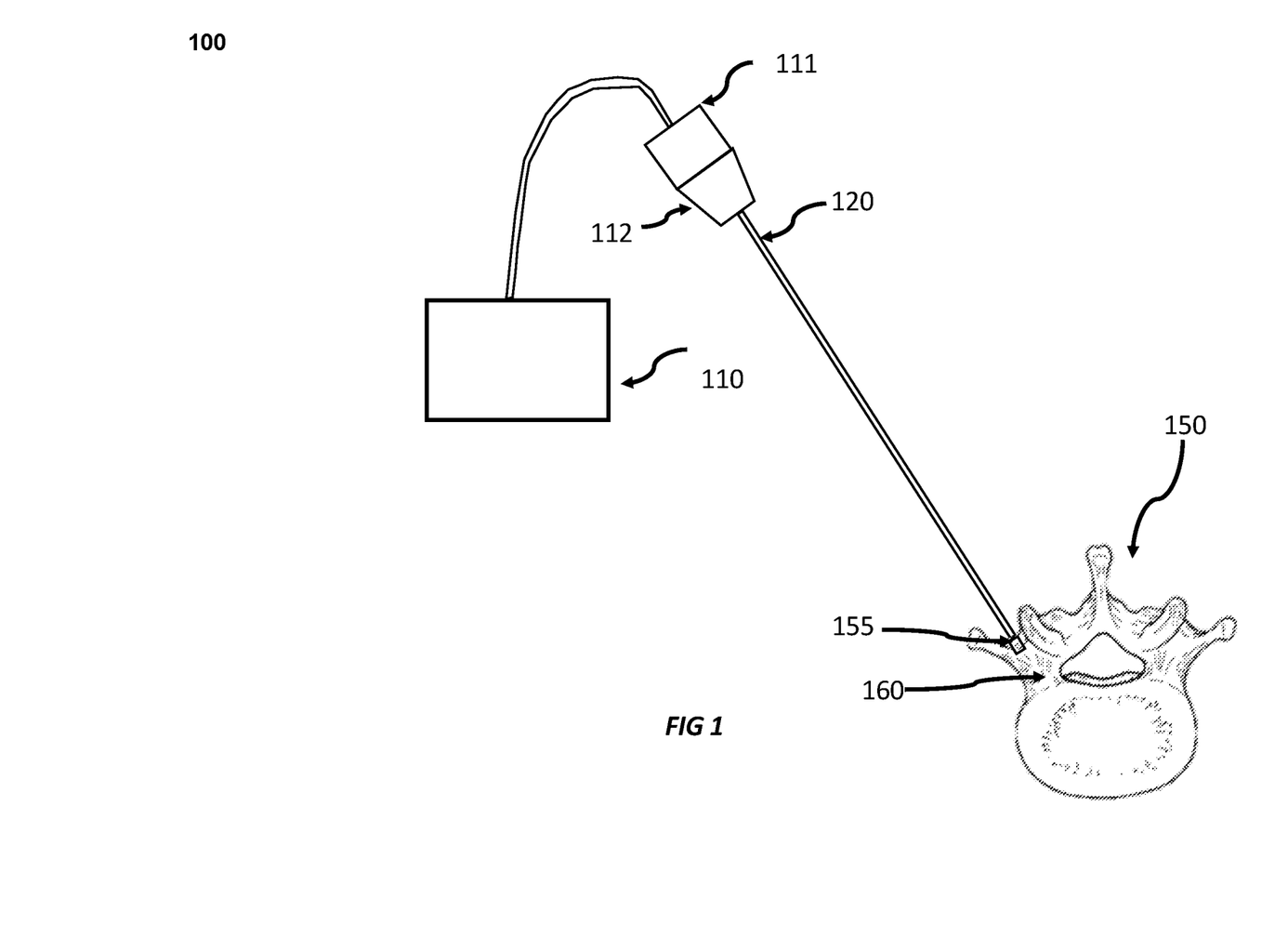
FIG. 1 provides a diagrammatic view of an example system for ultrasonically-assisted placement of an orthopedic implant consistent with certain disclosed embodiments.

FIG. 1 provides a diagrammatic view of a system 100 for ultrasonically assisted placement of an orthopedic implant. The system includes an ultrasonic generator 110 coupled to a transducer 111. The ultrasonic generator 110 and transducer 111 are coupled to a probe 120. Probe 120 is flexible in some implementations, while in other implementations the probe 120 is rigid. Optionally, the transducer 111 may optionally be coupled to a horn 112. Generator 110 produces electrical energy at ultrasonic frequencies that is then converted in mechanical vibrations by transducer 111. Additionally, the probe 120 serves a waveguide configured to receive and propagate the ultrasonic energy/mechanical vibrations to the target bone. Transducer 111 may also optionally serve as a sensor to sense reflecting ultrasonic waves. Sensing and analysis of reflected waves can provide information regarding the properties of the material in contact with the probe or tool tip and/or distance of surfaces, boundaries, and/or objects. For example, reflected ultrasonic waves, which are detected by transducer 111, can be transmitted from the transducer 111 to a computing device (e.g., computing device 600 shown in FIG. 6) for further analysis. This disclosure contemplates that transducer 111 and the computing device can be operably coupled through one or more communication links. This disclosure contemplates the communication links are any suitable communication link. For example, a communication link may be implemented by any medium that facilitates data exchange including, but not limited to, wired, wireless and optical links. Horn 112 may optionally serve the purpose of increasing the amplitude of vibrations and/or facilitate transfer of energy to the probe 120, which is coupled to the horn 112 in FIG. 1. Although the system 100 shown in FIG. 1 includes the horn 112, it should be understood that the horn 112 is an optional component. In other words, transducer 111 can be directly coupled to the probe 120 in some implementations.

The ultrasonic generator 110 can be any suitable ultrasonic generator that produces adequate power and range of frequencies for removal of bone. The ultrasonic generator 110 can include a controller configured to control at least one of ultrasonic power, amplitude, duration, or frequency of the ultrasonic energy. For example, frequencies for removing bone include, but are not limited to, frequencies in the range 10 kHz-150 kHz. It should be understood that duration for removing bone depends on bone characteristics (e.g., bone thickness). In some implementations, duration may be less than about 15 seconds. This disclosure contemplates that duration may be more or less than 15 seconds. Additionally, duration may be modulated to reduce heating of the elements. Ultrasonic generators typically have output power in a range between 1 W and 15 W. It should be understood that this output power range is provided only as an example and that higher or lower power may be used. This disclosure contemplates delivering ultrasonic energy of sufficient power and duration to cause removal of bone. This disclosure contemplates that a controller for the ultrasonic generator 110 can be implemented using one or more of the computing device components shown in FIG. 6. Additionally, the ultrasonic generator 110 can include a user interface configured to receive commands from a user. For example, the user (e.g., surgeon) can use the user interface to control at least one of ultrasonic power, amplitude, frequency, duration, and/or beam width to tailor to the specific goals of the procedure, for example, installing a pedicle screw. It should be understood that pedicle screw placement is only one example procedure. An example ultrasonic generator that can used in system 100 are ultrasonic generators produced by Beijing Ultrasonic Co. Ltd. of Beijing, China. Ultrasonic generators are known in the art and therefore not described in further detail herein. Example transducers are piezoelectric transducers. Example piezoelectric transducers are supplied by the Beijing Ultrasonic Co. Ltd. of Beijing, China. It should be understood that piezoelectric transducers are provided only as examples. This disclosure contemplates using other types of transducers. Horns can be machined metal (or other material) of different sizes and dimensions depending on the specific drilling needs.

Probe 120 can be aligned with a desired region 155 on a bone 150. Optionally, in some implementations, the probe 120 is placed in proximity to and/or in contact with the desired region 155. The region 155 is the target location where the user (e.g., surgeon) intends to deliver ultrasonic energy to assist with bone removal. Thereafter, probe 120 delivers ultrasonic energy to the desired region 155. In the figures, the bone 150 is a vertebrae. It should be understood that a vertebrae is provided only as an example bone. This disclosure contemplates that the bone 150 can be a bone other than a vertebrae, for example, a femur, tibia, pelvis, humerus or other bone.

The ultrasonic energy assists with bone removal in the region 155 to the extent necessary (e.g., to create a drilled hole) to facilitate placement of an orthopedic implant (not shown) into pedicle 160. For example, the system 100 can be used to breach the cortex of vertebra to open up an entry point for a pedicle screw. The ultrasonic vibrations delivered to the desired region 155 of the bone 150 via the probe 120 reduce the dynamic friction between the probe 120 and bone 150. In other words, the system 100 is used to cause vibrations in both the bone 150 and the probe 120, which reduces dynamic friction between the opposing objects. As a result, the reaction force is also reduced, which makes it easier to remove bone in the region 155. Alternatively or additionally, this reduces and/or eliminates the risk of skiving, where the probe 120 slips along the surface of the bone 150. It should be understood that skiving can lead to implant (e.g., pedicle screw) misplacement. By reducing reaction force using the system 100, a surgeon can maintain trajectory of the probe 120 with lower applied force. Optionally, as described below, the ultrasonic vibrations can be delivered to the desired region 155 of the bone 150 via a surgical instrument and/or an implant (e.g., the implementations described with regard to FIGS. 2-4). This reduces the dynamic friction between the surgical instrument and/or implant and the bone 150. Additionally, in some implementations, the probe 120 can be used to mechanically remove bone in the region 155. This can occur in conjunction with removal using ultrasonic energy. In some implementations, bone is simultaneously removed mechanically with the probe 120 (e.g., rotary motion) and using ultrasonic energy. In other words, mechanical and ultrasonic modes are combined. In other implementations, the user switches between mechanical and ultrasonic modes to remove the bone.

Figure 2:
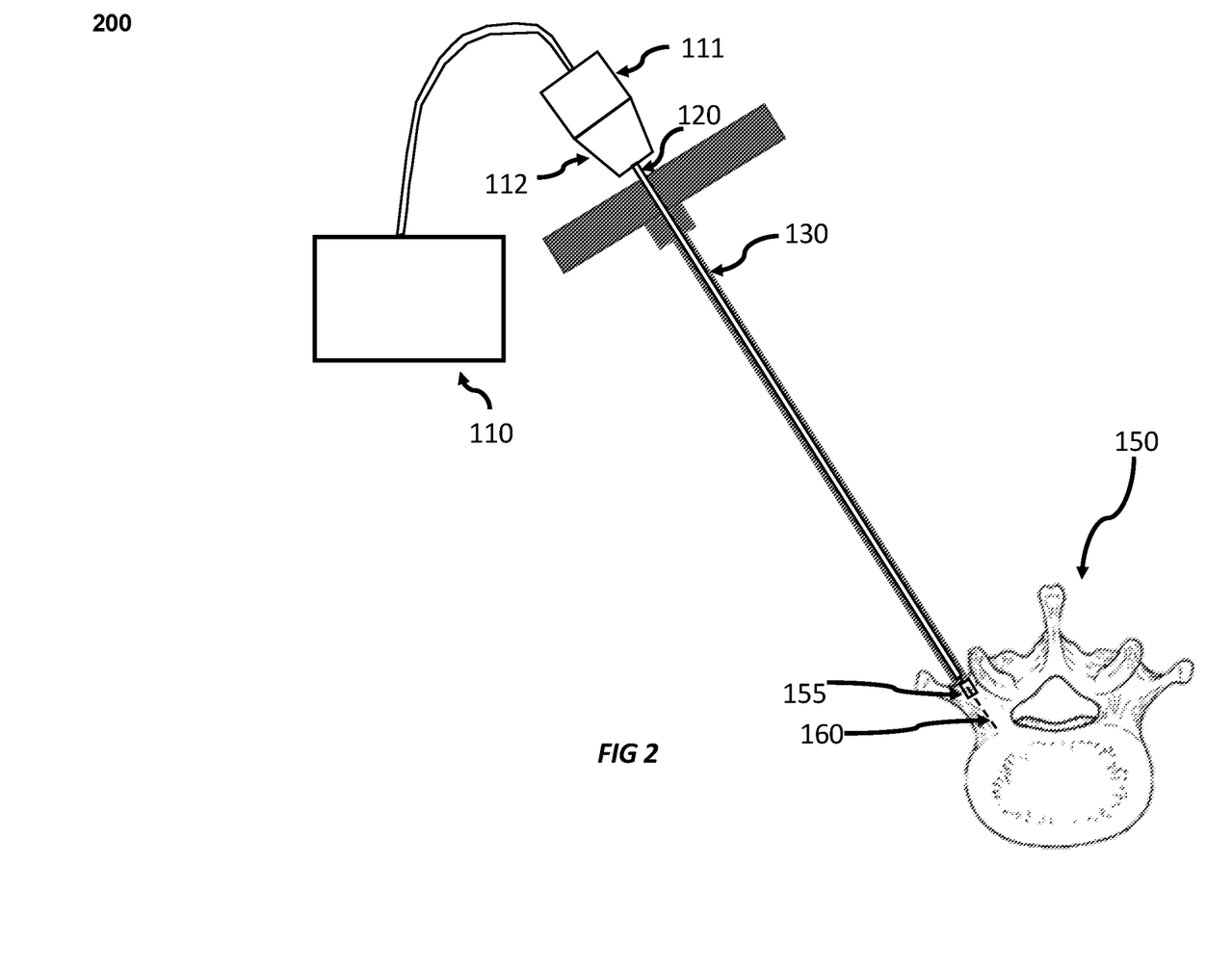
FIG. 2 provides a diagrammatic view of another example system for ultrasonically-assisted placement of an orthopedic implant consistent with certain disclosed embodiments.

FIG. 2 provides a diagrammatic view of another system 200 for ultrasonic assisted placement of an orthopedic implant. The system 200 includes an ultrasonic generator 110, a transducer 111, a horn 112, and a probe 120. These features are described in detail above with regard to FIG. 1 and are therefore not described in further detail with regard to FIG. 2. In FIG. 2, the probe 120 is passed through a cannulated surgical instrument 130. Ultrasonic energy is delivered to the desired region 155 on the bone 150. There may also be resonance, coupling or transfer of ultrasonic energy between the probe 120 and the cannulated surgical instrument 130, thus reducing the dynamic friction between cannulated surgical instrument 130 and the bone 150, as described in detail for FIG. 1. Examples of cannulated surgical instruments 130 include, but are not limited to, Jamshidi needle, awls, and/or probes. The surgical instrument 130 can combine rotary and/or other conventional modes of use (e.g., mechanical) with ultrasonic energy to remove bone at a desired location and/or depth. For example, the surgical instrument 130 may rotate and vibrate at the same time to breach cortex of vertebra to facilitate placement of a pedicle screw into pedicle 160.

Figure 3:
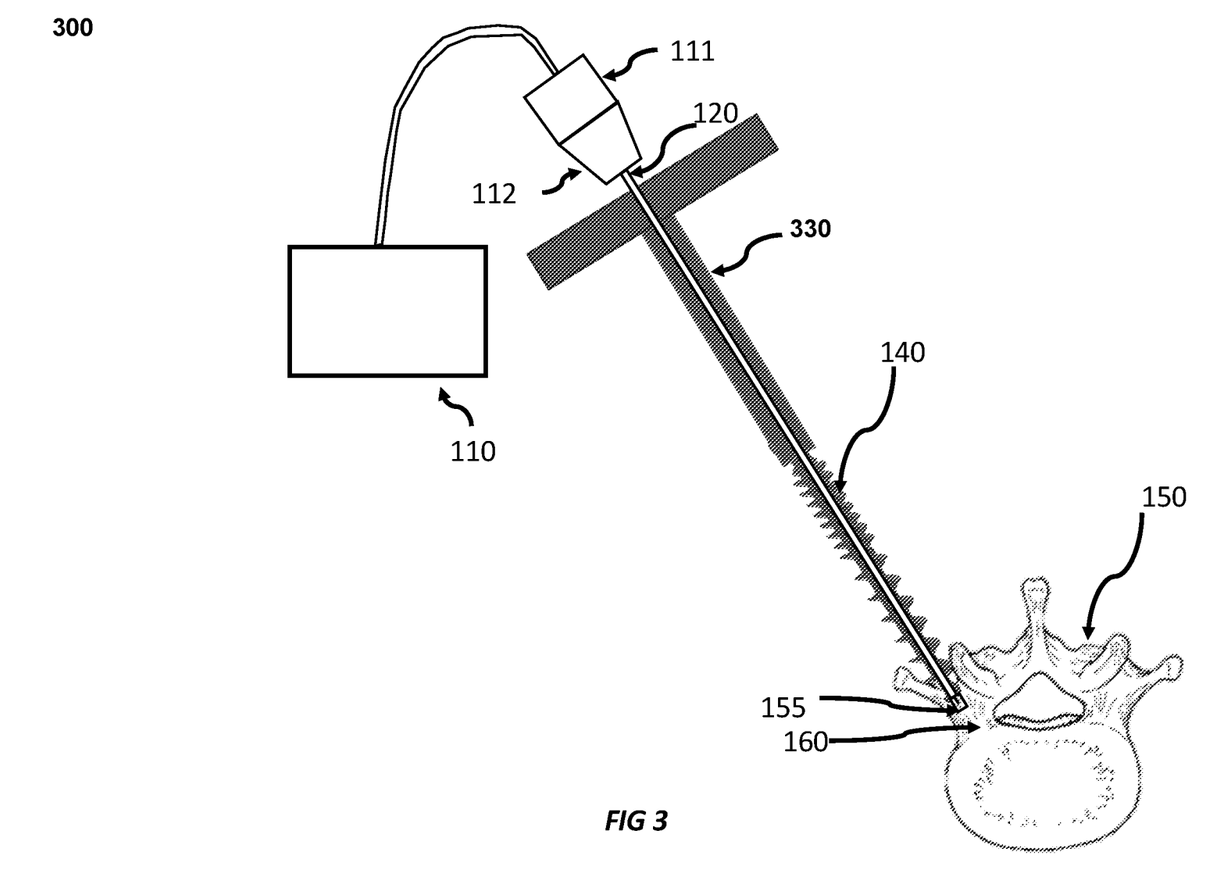
FIG. 3 provides a diagrammatic view of another example system for ultrasonically-assisted placement of an orthopedic implant consistent with certain disclosed embodiments.

FIG. 3 provides a diagrammatic view of another alternate system 300 for ultrasonically-assisted placement of an orthopedic implant. The system 300 includes an ultrasonic generator 110, a transducer 111, a horn 112, and a probe 120. These features are described in detail above with regard to FIG. 1 and are therefore not described in further detail with regard to FIG. 3. In FIG. 3, probe 120 is passed through a cannulated surgical screwdriver 330 and screw 140. The screw 140 is coupled with the screwdriver 330. In FIG. 3, the screw 140 is a pedicle screw. Although a pedicle screw is provided as an example, this disclosure contemplates that the screw 140 is not limited to pedicle screws. Ultrasonic energy is delivered to the desired region 155 on the bone 150. There may also be resonance, coupling or transfer of ultrasonic energy between the probe 120 and the cannulated surgical screwdriver 330 and screw 140, thus reducing the dynamic friction between the screw 140 and the bone 150, as described in detail for FIG. 1. The surgical screwdriver 330 can combine rotary and/or other conventional modes of uses (e.g., mechanical) with ultrasonic energy to remove bone at a desired location and/or depth. For example, the surgical screwdriver 330 can rotate and vibrate at the same time to breach cortex of vertebra to facilitate placement of screw 140 into pedicle 160.

Figure 4:
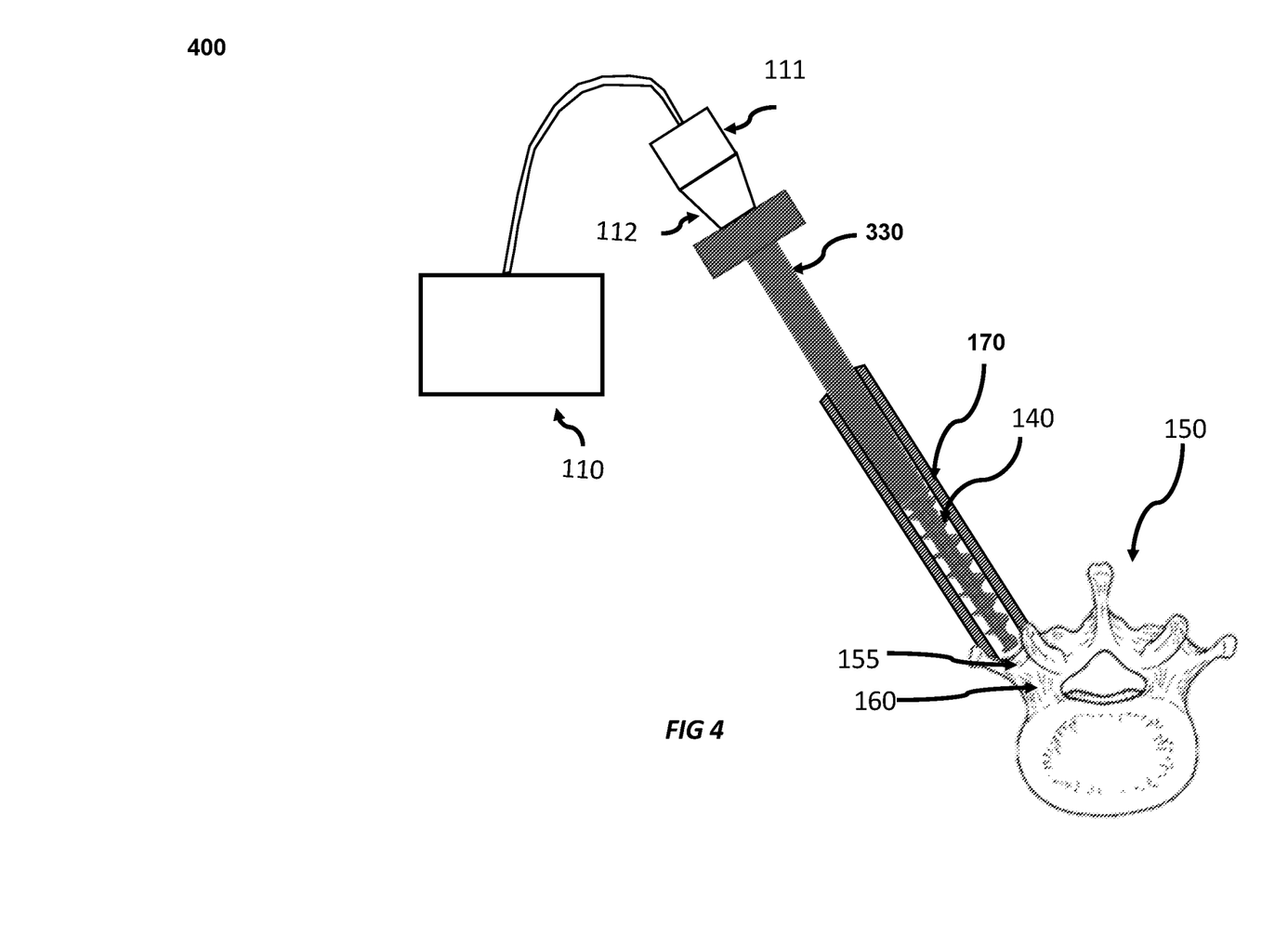
FIG. 4 provides a diagrammatic view of another example system for ultrasonically-assisted placement of an orthopedic implant consistent with certain disclosed embodiments.

FIG. 4 provides a diagrammatic view of another system 400 for ultrasonically-assisted placement of an orthopedic implant. The system 400 includes an ultrasonic generator 110, a transducer 111, and a horn 112. These features are described in detail above with regard to FIG. 1 and are therefore not described in further detail with regard to FIG. 4. In FIG. 4, transducer 111 and/or horn 112 are directly coupled to surgical screwdriver 330, i.e., without the need for a probe as shown in FIG. 3, thus directly transferring ultrasonic energy to the surgical screwdriver 330 and the screw 140. Additionally, a tubular retractor or tissue protector 170 is used to facilitate access to the bone 150 through soft tissue. Ultrasonic energy is delivered to the desired region 155 on the bone 150. The ultrasonic energy transferred to the surgical screwdriver 330 and screw 140 reduces the dynamic friction between the screw 140 and the bone 150, as described in detail for FIG. 1. The surgical screwdriver 330 can combine rotary and/or other conventional modes of uses (e.g., mechanical) with ultrasonic energy to remove bone at a desired location and/or depth. For example, the surgical screwdriver 330 can rotate and vibrate at the same time to breach cortex of vertebra to facilitate placement of screw 140 into pedicle 160.

Figure 5:
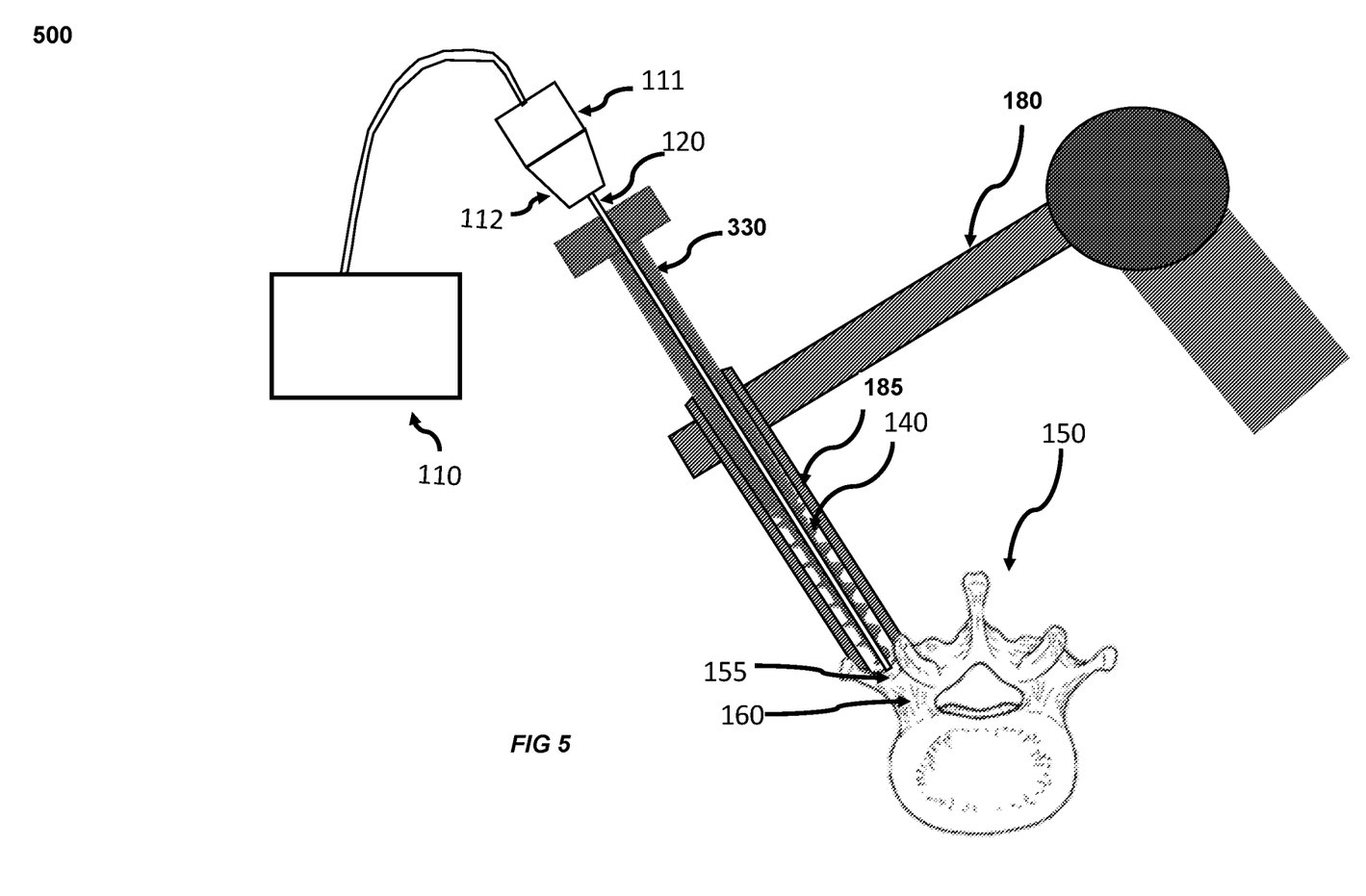
FIG. 5 provides a diagrammatic view of another example system for ultrasonically-assisted placement of an orthopedic implant consistent with certain disclosed embodiments.

FIG. 5 provides a diagrammatic view of another system 500 for ultrasonically-assisted placement of an orthopedic implant consistent. The system 500 includes an ultrasonic generator 110, a transducer 111, a horn 112, and a probe 120. These features are described in detail above with regard to FIG. 1 and are therefore not described in further detail with regard to FIG. 5. In FIG. 5, the system 500 includes a robotic arm 180, which is used to position the surgical screwdriver 330 using guide 185. In this embodiment the system 500 includes navigation and/or robotic sub-systems for computer assisted surgery. Surgical navigation systems are known in the art and are therefore not described in detail herein. Additionally, robotic surgical systems are known in the art and are therefore not described in detail herein. The robotic sub-system can include a computer-controlled robotic system and the robotic arm 180. Any surgical robotic system that is designed to position an end effector relative to the patient's anatomy can be utilized in system 500. A non-limiting example of a robotic sub-system that can be used in the embodiment as described above is the MAZOR-X robotic system by Medtronic, Dublin, Ireland. It should be understood that other robotic surgical systems can be used with the tool, systems, and methods described herein. Alternatively, the robotic arm 180 may be mechanically connected to surgical screwdriver 330, for example, using quick connect or other mechanisms. Ultrasonic energy is delivered to the desired region 155 on the bone 150. The surgical screwdriver 330 can combine rotary and/or other conventional modes of uses (e.g., mechanical) with ultrasonic energy to remove bone at a desired location and/or depth. For example, the surgical screwdriver 330 can rotate and vibrate at the same time to breach cortex of vertebra to facilitate placement of screw 140 into pedicle 160. This disclosure contemplates that a robotic arm can be used in conjunction with any of the systems described above with regard to FIGS. 1-4.

It should be appreciated that the logical operations described herein with respect to the various figures may be implemented (1) as a sequence of computer implemented acts or program modules (i.e., software) running on a computing device (e.g., the computing device described in FIG. 6), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
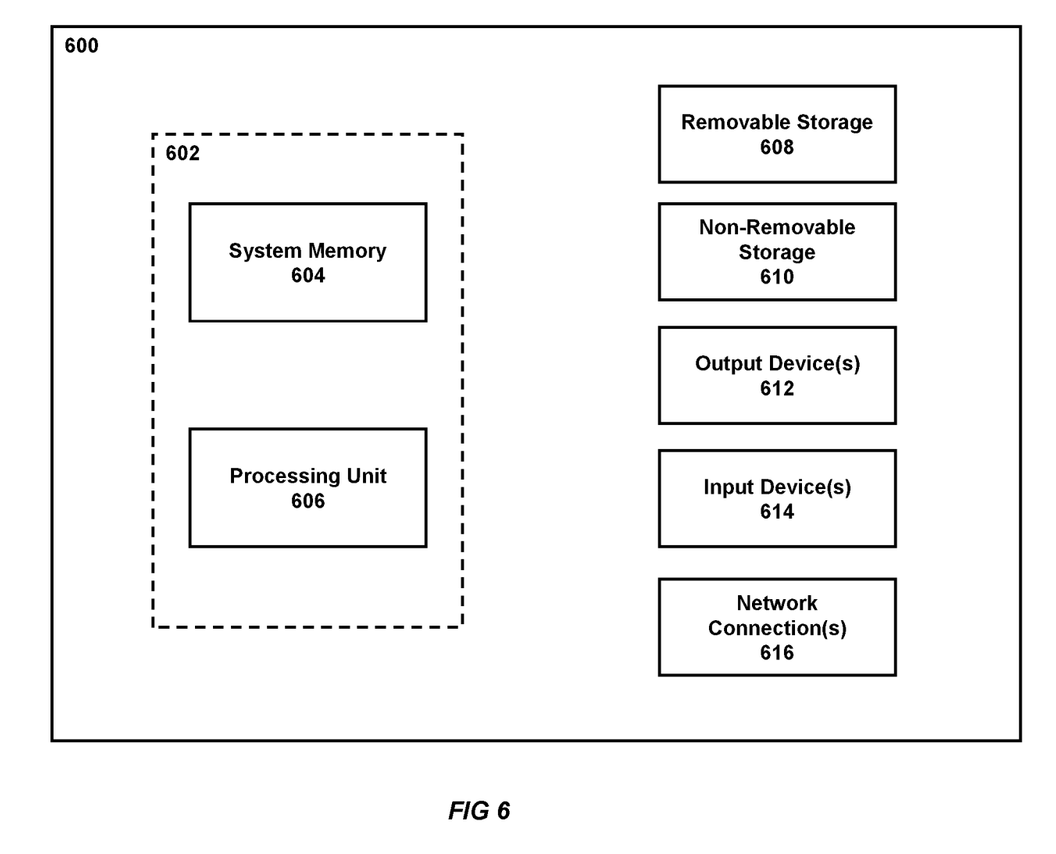
FIG. 6 is a block diagram of an example computing device.

Referring to FIG. 6, an example computing device 600 upon which the methods described herein may be implemented is illustrated. It should be understood that the example computing device 600 is only one example of a suitable computing environment upon which the methods described herein may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

According to the systems and methods for ultrasonically-assisted implant placement described herein, ultrasonic energy is delivered directly to a surgical instrument such as a Jamshidi needle, K-wire, awl, probe, tap, screwdriver or screw. The ultrasonic energy reduces the dynamic friction between the surgical instrument and bone or between the implant and bone. In particular, by causing both the surgical instrument and/or implant and the bone to vibrate, dynamic friction between the surgical instrument or implant and the bone is reduced. This allows a surgeon to use the mechanical abilities of the surgical instrument along with ultrasonic energy to accomplish the surgical goals.

Figure 7:
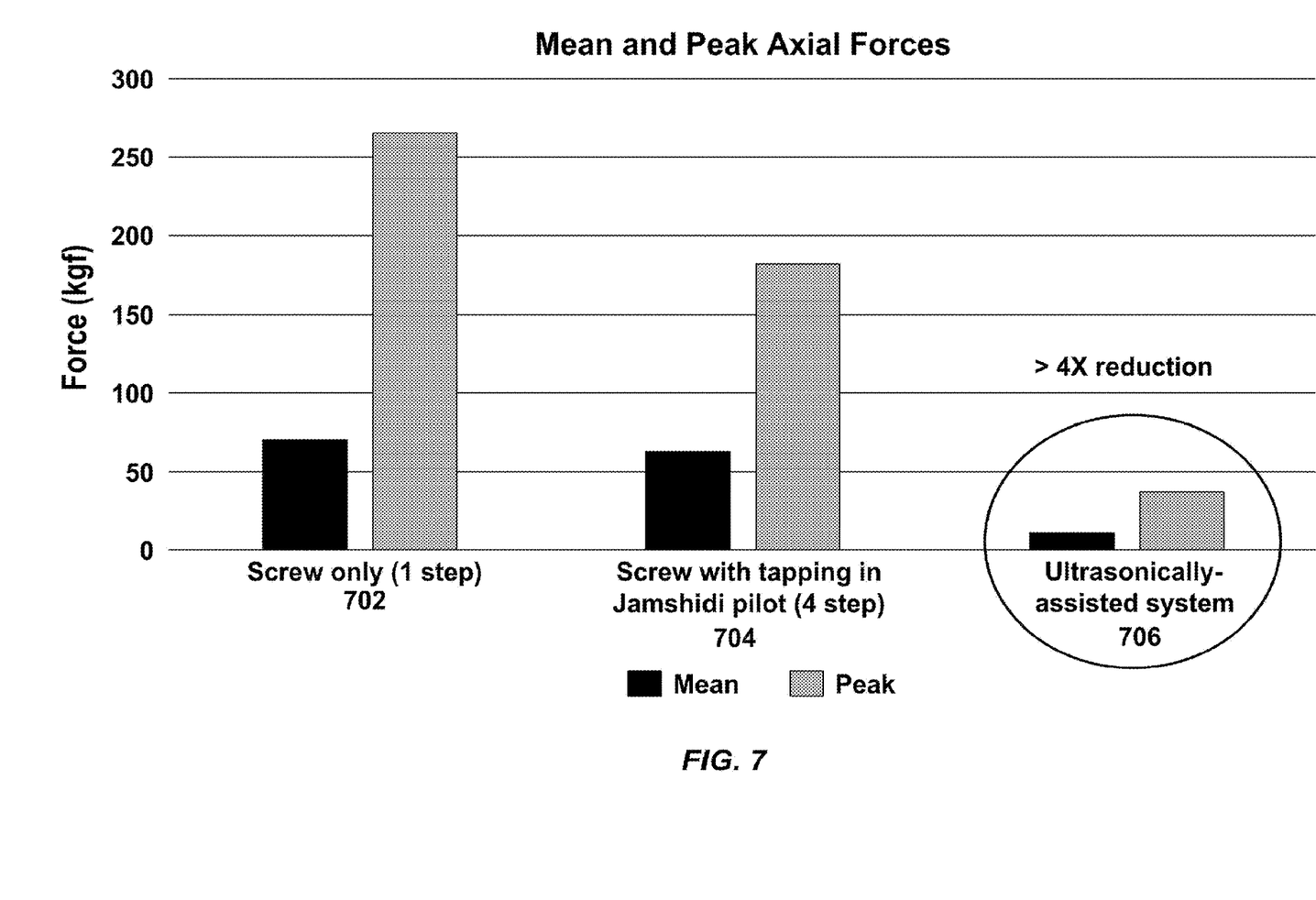
FIG. 7 is a chart illustrating axial force reduction achieved using the systems and methods for ultrasonically-assisted implant placement described herein.

Referring now to FIGS. 7-10, advantages of the systems and methods for ultrasonically-assisted implant placement described herein are shown. FIG. 7 is a chart illustrating the axial force reduction achieved using the systems and methods for ultrasonically-assisted implant placement described herein. Mean and peak axial forces for pedicle screw placement using different techniques are shown. Bars 702 represent conventional 1-step pedicle screw placement, i.e., driving the screw directly into the bone. Bars 704 represent conventional pedicle screw placement where the hole is initially tapped using a Jamshidi needle before driving the screw. Bars 706 represent pedicle screw placement using systems and methods for ultrasonically-assisted implant placement described herein. As noted in FIG. 7, the systems and methods described herein result in more than four times reduction of axial force as compared to the conventional techniques.

Figure 8:
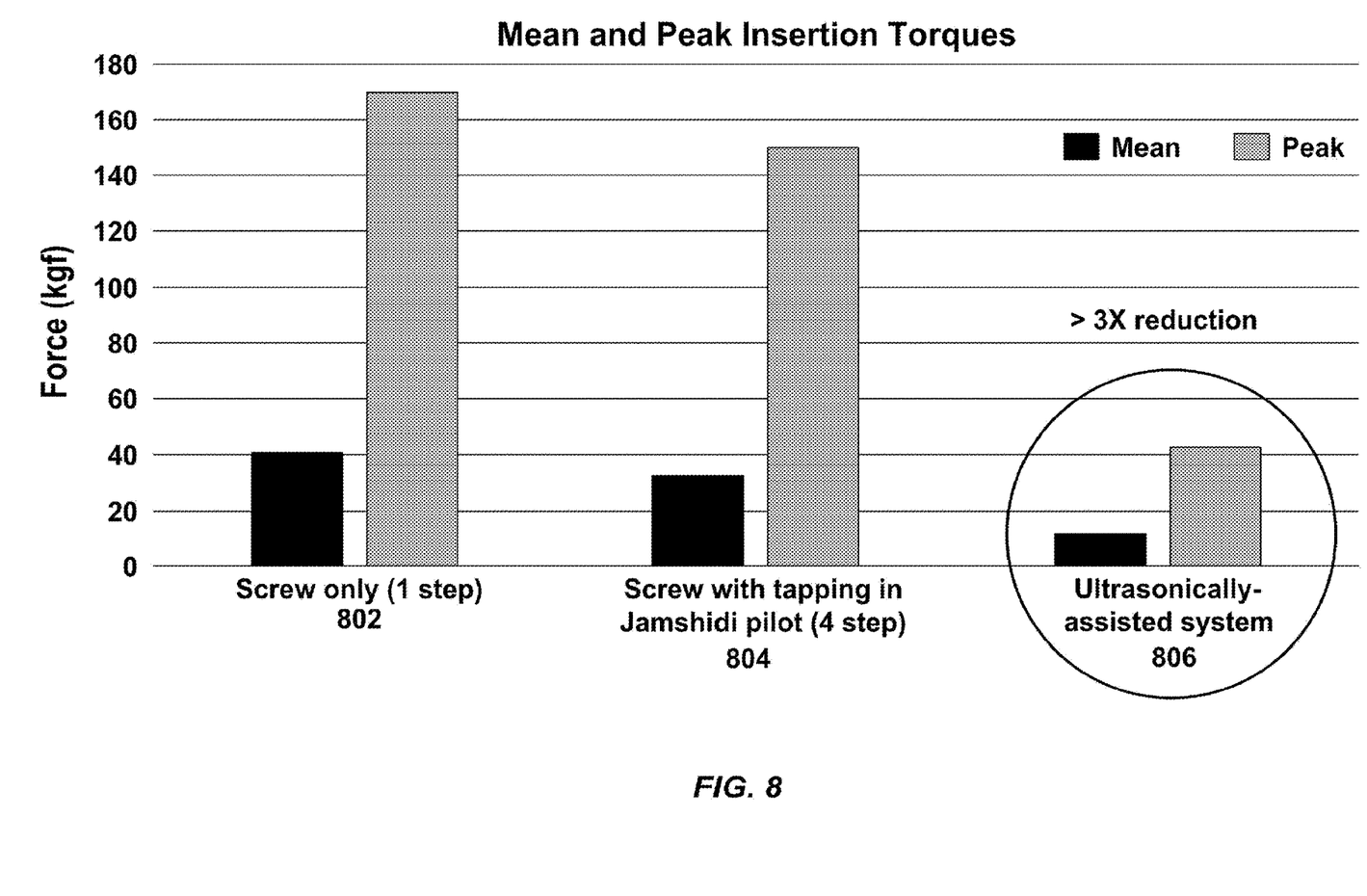
FIG. 8 is a chart illustrating insertion torque reduction achieved using the systems and methods for ultrasonically-assisted implant placement described herein.

FIG. 8 is a chart illustrating insertion torque reduction achieved using the systems and methods for ultrasonically-assisted implant placement described herein. Mean and peak torques for pedicle screw placement using different techniques are shown. Bars 802 represent conventional 1-step pedicle screw placement, i.e., driving the screw directly into the bone. Bars 804 represent conventional pedicle screw placement where the hole is initially tapped using a Jamshidi needle before driving the screw. Bars 806 represent pedicle screw placement using systems and methods for ultrasonically-assisted implant placement described herein. As noted in FIG. 8, the systems and methods described herein result in more than three times reduction of insertion torque as compared to the conventional techniques.

Figure 9:
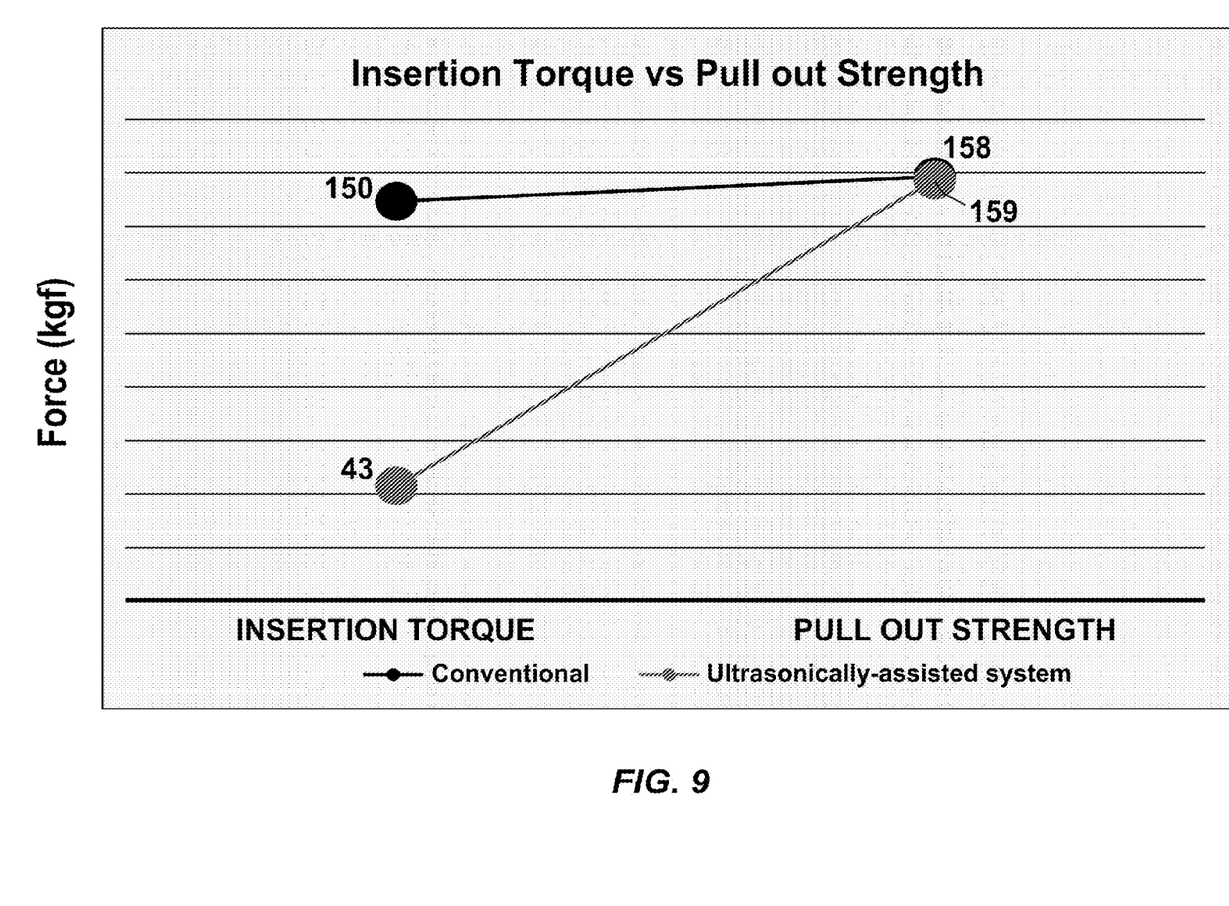
FIG. 9 is a chart illustrating an insertion torque-to-pull out strength comparison according to an example described herein.

FIG. 9 is a chart illustrating an insertion torque-to-pull out strength comparison according to an example described herein. The chart compares insertion torques and pull out strength for pedicle screw placement using two different techniques. In the conventional technique, a 55 mm pedicle screw was inserted after a 45 mm tap using a Jamshidi needle. The insertion torque and pull out strength were 150 and 159 kgf, respectively. In the ultrasonically-assisted technique, a 55 mm pedicle screw was inserted using the systems and methods described herein. The insertion torque and pull out strength were 43 and 158 kgf, respectively. FIG. 9 shows that while the insertion torque is substantially reduced using the systems and methods for ultrasonically-assisted implant placement described herein, the pull out strength remains substantially the same as when a conventional technique is used.

Figure 10:
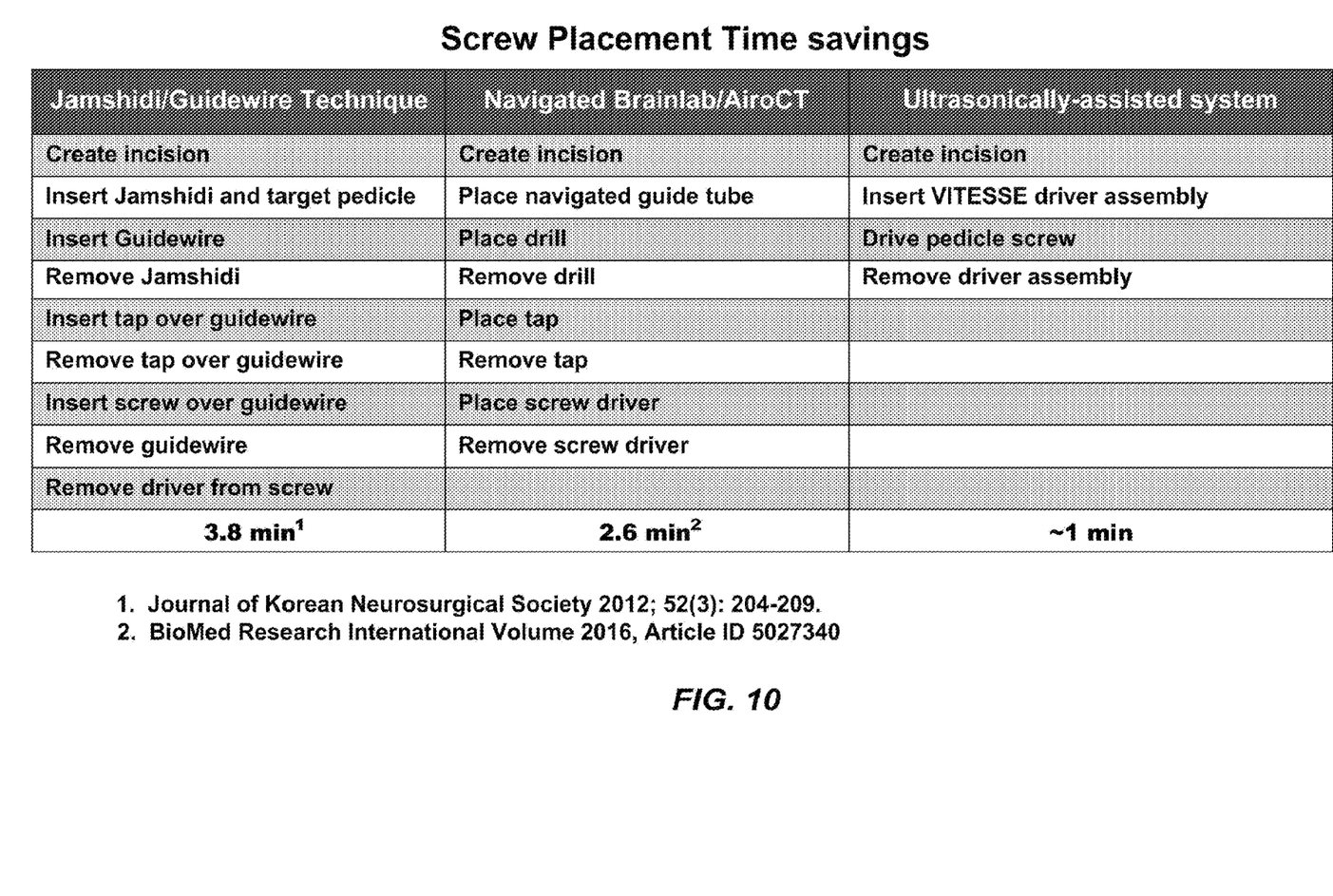
FIG. 10 is a table illustrating pedicle screw placement time savings achieved using the systems and methods for ultrasonically-assisted implant placement described herein.

FIG. 10 is a table illustrating pedicle screw placement time savings achieved using the systems and methods for ultrasonically-assisted implant placement described. As shown in FIG. 10, the systems and methods described herein reduce the placement time as compared to two conventional pedicle screw placement procedures. The systems and methods described herein also reduce the number of steps required to place the pedicle screw.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for ultrasonically-assisted placement of an orthopedic implant comprising:
providing an ultrasonic probe;
providing a surgical instrument that includes a cannula;
positioning a portion of said ultrasonic probe in said cannula of said surgical instrument;
moving said ultrasonic probe and said surgical instrument to a bone;
delivering ultrasonic energy to said bone and moving said surgical instrument relative to said bone to cause removal of a portion of said bone at a target location to form an opening in said bone; said ultrasonic energy is delivered via said ultrasonic probe coupled to an ultrasonic generator and a transducer; said ultrasonic probe is aligned with said target location on said bone to facilitate delivery of said ultrasonic energy to said target location;
switching between mechanical removal of said bone and use of said ultrasonic probe during said removal of said bone at said target location; and
inserting a screw into said opening in said bone.

2. The method as defined in claim 1, wherein said ultrasonic probe includes said ultrasonic generator and said transducer.

3. The method as defined in claim 1, wherein said step of moving includes moving said ultrasonic probe through said cannula of said surgical instrument.

4. The method as defined in claim 3, wherein said surgical instrument is a K-wire, a Jamshidi needle, an awl, a probe tool, a tap, a surgical screwdriver, or a surgical screwdriver and said screw.

5. The method as defined in claim 1, further including the step of controlling at least one of ultrasonic power, amplitude, frequency, duration, beam width, and/or region of contact to cause removal of said bone at said target location.

6. The method as defined in claim 1, wherein said ultrasonic removal of a portion of said bone occurs concurrent with placement of said orthopedic implant.

7. The method as defined in claim 1, wherein said ultrasonic probe is attached to a robotic arm.

8. The method as defined in claim 1, further comprising detecting reflected ultrasonic waves using said transducer.

9. The method as defined in claim 1, wherein delivery of said ultrasonic energy to said target location is configured to reduce dynamic friction between said ultrasonic probe and said bone.

10. The method as defined in claim 1, wherein delivery of said ultrasonic energy to said target location is configured to a) reduce a reaction force, or b) reduce or eliminate a risk of skiving.

11. An instrument for ultrasonically-assisted placement of an orthopedic implant comprising:
a surgical instrument that includes a cannula; said surgical instrument includes a surgical screwdriver and a screw; said cannula located in said surgical screwdriver; and
a flexible or rigid ultrasonic probe that is at least partially located in said cannula of said surgical instrument; said ultrasonic probe includes a tip configured to allow passage of ultrasonic energy into said screw that is releasably engagement with said surgical screwdriver; and wherein said ultrasonic probe is configured to facilitate in an insertion of said screw into bone by conveying ultrasonic energy to said screw as said surgical screwdriver rotates said screw during insertion of said screw into a bone.

12. The instrument as defined in claim 11, further including an ultrasonic generator that is coupled to a transducer; said ultrasonic probe is coupled transducer.

13. A method for ultrasonically-assisted placement of an orthopedic implant comprising:
- providing an ultrasonic probe; said ultrasonic probe includes said ultrasonic generator and said transducer;
- providing a surgical instrument that includes a cannula; said surgical instrument includes a surgical screwdriver and a screw; said screw is removably engaged with said surgical screwdriver; said cannula located in said surgical screwdriver;
- positioning a portion of said ultrasonic probe in said cannula of said surgical instrument;
- moving said ultrasonic probe and said surgical instrument to a bone;
- delivering ultrasonic energy to said bone via said screw while said screw in in contact with said bone and while said surgical screwdriver is rotating said screw; and
- wherein said rotation of said screw by said surgical screwdriver and said ultrasonic energy being applied to said bone causes removal of a portion of said bone at a target location to form an opening in said bone for said screw; said ultrasonic energy is delivered via said ultrasonic probe coupled to an ultrasonic generator and a transducer.

14. The method as defined in claim 13, further including the step of controlling at least one of ultrasonic power, amplitude, frequency, duration, beam width, and/or region of contact to cause removal of said bone at said target location.

15. The method as defined in claim 14, further including the step of switching between mechanical removal of said bone and use of said ultrasonic probe during said removal of said bone at said target location.

16. The method as defined in claim 15, wherein said ultrasonic probe and said surgical instrument are attached to a robotic arm.

17. The method as defined in claim 16, further comprising detecting reflected ultrasonic waves using said transducer.

18. The method as defined in claim 13, further including the step of switching between mechanical removal of said bone and use of said ultrasonic probe during said removal of said bone at said target location.

19. The method as defined in claim 13, wherein said ultrasonic probe and said surgical instrument are attached to a robotic arm.

20. The method as defined in claim 13, further comprising detecting reflected ultrasonic waves using said transducer.

* * * * *